United States Patent

[11] 3,623,689

[72] Inventor Donald L. Johnston
  7324 Calumet, Hammond, Ind. 46324
[21] Appl. No. 841,400
[22] Filed July 14, 1969
[45] Patented Nov. 30, 1971

[54] EYEGLASS FRAME ALIGNMENT HOLDER
  10 Claims, 7 Drawing Figs.
[52] U.S. Cl. ........................................... 248/187,
  248/DIG. 2
[51] Int. Cl. .......................................... F16m 11/04
[50] Field of Search.................................. 248/DIG. 2,
  187, 309, 451, 346; 211/13, 29/20; 81/3.5;
  351/158, 155, 41; 206/5

[56] References Cited
UNITED STATES PATENTS
| | | | |
|---|---|---|---|
| 1,065,060 | 6/1913 | Leyner | 248/346 |
| 2,210,102 | 8/1940 | Steudel | 248/346 |
| 2,411,361 | 11/1946 | Bongiovanni | 248/DIG. 2 |
| 2,684,002 | 7/1954 | Horvath | 81/3.5 |

Primary Examiner—Edward C. Allen
Attorney—Greist, Lockwood, Greenawalt & Dewey

ABSTRACT: An eyeglass frame alignment holder adapted to retain a pair of eyeglasses in place thereon and to exert a slight but continuous force urging the outer margin of the eyeglass frame toward a rearward position and generally into coplanar alignment with the nosepiece. One described form of the invention is a holder in which retainer means in the form of a clip is provided for engaging the frame in the vicinity of the bridge to prevent rearward movement thereof, and in which two inclined leaf or wing portions are provided which are adapted to engage the spectacle frame adjacent its outer margins near the point where the earpieces or temples are hingedly joined to the lens frame. The holder may be a piece of polished or felt-covered spring steel which, after a period of time, gradually returns the eyeglass frame to its original configuration. The clip may be a separate piece or may be integrally formed from the material comprising the wings, and the holder may includes a mounting base, or may include only the wings and the clip so as to provide increased portability without loss of effect.

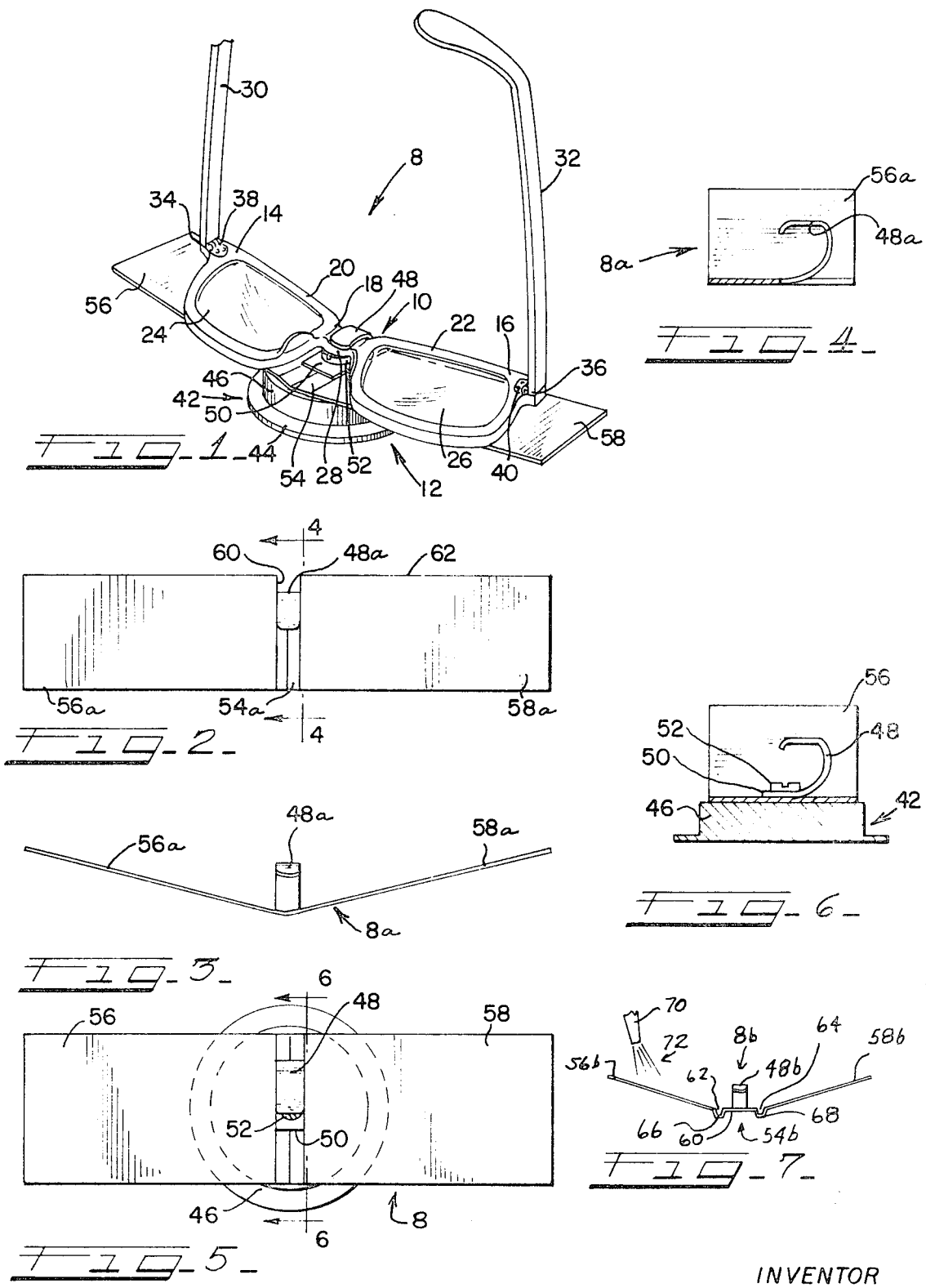
PATENTED NOV 30 1971
3,623,689
INVENTOR
DONALD L. JOHNSTON

EYEGLASS FRAME ALIGNMENT HOLDER

BACKGROUND OF THE INVENTION

The present invention relates generally to eyeglass or spectacle holders and more particularly, to a device which is adapted to receive and hold a pair of eyeglasses or spectacles therein and, by reason of a slight force applied over a long period of time, induce cold flow of the thermoplastic eyeglass frames and return them to their original alignment, normally an alignment in which the outer margins of the frame adjacent the attachment point of the earpieces are in a coplanar relation with respect to the frame bridge.

Because of the wide variety of sizes, shapes, colors and textures available, and because of light weight, resistance to breakage, etc., thermoplastic eyeglass frames have attained extremely widespread popularity. Although metal frames for eyeglasses are still common, millions of plastic frames are sold every year and many millions thereof are in daily use.

Although plastic eyeglass frames have the advantage referred to above, and other advantages, these frame units have one drawback which is extremely common and, in certain aggravated cases, annoying, inconvenient, and actually harmful to the eyes of the wearer. This characteristic is that thermoplastic eyeglass frames which are sufficiently flexible to be easy to manufacture, easy to align on the wearer and resilient enough to be free from brittleness, undergo a certain amount of deformation, sometimes referred to as cold flow, during the period such eyeglasses are worn.

For example, in order for eyeglasses to be retained in place over the face of the wearer, the earpieces or temple portions of the eyeglasses exert a certain inwardly directed pressure on the temples of the wearer, and this force is generated, and also counterbalanced, by the resistance of the front portion of the frame, that is, the lens-receiving portions and the bridge portion joining them together, to forward deformation. In other words, when earpieces or temple portions are in their most widely spaced-apart position, the front edge portions thereof engage the rearwardly facing margin portions of the frame just outside the outermost edges of the lenses. Any force tending to spread the earpieces farther apart tends to move these rear edge portions forward, thereby bending the frame at the point which offers the least stiffness in bending. Since the glass lenses are very stiff relative to the frame, the bending forces are concentrated in the vicinity of the bridge or nosepiece of the frame.

On the other hand, if there is very little or no force urging the temple pieces outwardly, the temple pieces are loosely received on the head, since they have not reached their full outward extent, and the glasses fit loosely, a condition which is not desired by the wearer. In any event, if the portions of the frames supporting the lens are bent forwardly in respect to the bridge portion, the axis lines through the optical centers of the lenses move to a position where they are convergent a short distance in front of the eyeglasses rather than being roughly parallel to each other. As a result, the wearer is not looking through the centers of the lenses, or, if looking through the centers of the lenses, is looking therethrough at an angle to the intended sight angle which is coincident with the optical axis of the lens.

In the past, two methods for overcoming these drawbacks of improperly fitting plastic lens frames have been proposed and used. The first is inconvenient and often expensive, namely an occasional or even frequent return to the optician who fit the eyeglasses so that they may be returned to their proper alignment, usually by heating and bending. If the wearer attempts this realignment himself, he commonly does not know that the frame should be heated, and, as a result, risks breaking the frame, whereas, if he does succeed in bending the frame, he is often unable to determine exactly what the properly aligned position of the frame should be.

A second expedient which is quite common is to place a wedge unit of some kind, commonly small rubber bands or the like, in the intended abutment region defined between the forwardly and rearwardly facing surfaces respectively of the earpieces and outer lens frame margins. While this procedure offers temporary relief insofar as it temporarily moves the temple pieces closer together for a tighter fit about the head, it actually aggravates the misalignment situation, because it introduces additional stress which can only be relieved by further forward bending of the frame element.

As long as the eyeglass continues to be worn, there is no presently known method of avoiding the gradual effect of frame distortion, since the heat of the wearer's body and the continued forward force on the rear of the frame ends inevitably bring about the cold flow referred to.

Accordingly, an object of the invention is to provide a simple and effective method of realigning eyeglass frames, and an apparatus adapted to perform such a method.

An additional object of the invention is to provide a simple and inexpensive apparatus which will realign eyeglass frames without requiring intentional manipulation of the frames by the user.

Another object is to provide an eyeglass frame alignment holder which may be preset to maintain proper eyeglass frame alignment, and which will thereafter maintain proper alignment in the frame of a pair of eyeglasses placed therein at regular intervals.

A still further object is to provide an apparatus which operates without efforts on the part of the user, and which is commonly used at a time when the eyeglasses themselves are not intended to be used.

Another object is to provide such a device which may be adapted for extended use in one relatively fixed location, or to provide a holder which is readily portable, as well as a holder being textured or surfaced so as to avoid, in use, damage to eyeglass lenses and frames.

A still further object is to provide such a holder which is simple, inexpensive, reliable, and esthetically pleasing.

The present invention achieves these and other objects inherent therein by providing an eyeglass frame alignment holder having means for receiving and holding the frame in the vicinity of the bridge portion thereof, and means for engaging the outer margin portions of the frame and applying a slight, preset, rearwardly directed force thereto for bringing about a return to proper alignment of the eyeglass frame.

The exact manner in which this invention achieves these and other objects will be more clearly apparent when reference is made to the accompanying detailed description, to the appended claims, and to the drawings, in which like reference numerals indicate corresponding parts throughout.

BRIEF DESCRIPTION OF THE DRAWINGS

FIG. 1 is a perspective view showing a pair of eyeglasses received within the frame alignment holder of the invention;

FIG. 2 is a top plan view of another embodiment of a holder according to the invention;

FIG. 3 is a rear elevational view of the holder of FIG. 2;

FIG. 4 is a vertical sectional view of the form of holder shown in FIGS. 2 and 3, and taken along lines 4—4 of FIG. 2;

FIG. 5 is a top plan view of the embodiment of the holder shown in FIG. 1;

FIG. 6 is a vertical sectional view of the holder of FIG. 5, taken along lines 6—6 thereof; and FIG. 7 is a front elevational view of still another embodiment of the invention.

DESCRIPTION OF THE PREFERRED EMBODIMENTS OF THE INVENTION

The invention will now be described in reference to several preferred embodiments thereof, it being understood that herein, and in the claims, direction or orientation indicating words such as "rearward," "forward, " etc., unless otherwise stated, are intended to be applied in relation to the position the spectacles assume in the use thereof while being worn by a person whose head is straight and level and whose eyes are directed to the front, since, as the description proceeds, it will be apparent that the device itself may be used in any orientation with advantageous effect, and normally rests with the eyeglasses held therein a position other than the position in which they are normally worn.

In ordinary use, the invention includes a frame alignment holder 8 adapted to receive the frame portion 10 of a pair of spectacles or eyeglasses 12 within the holder 8, which is adapted to exert slight but steady rearward force on the outer edge or marginal portions 14, 16 of the frame 10 of a pair of eyeglasses or spectacles 12, while retaining or holding the bridge portion 18 against rearward movement.

The frame 10 of the eyeglasses 12, in addition to the portions just described, include a pair of oppositely disposed, lens-receiving portions 20, 22, serving to hold left and right hand lenses 24, 26 in position, and a reentrant portion 28 adapted to fit over the nose, above which the bridge portion 18 extends. Further, a pair of left- and right-hand earpieces or temple portions 30, 32 are provided, each having a forward end 34, 36, the front face of which abuts a rear face of the frame portion 10 in the vicinity of the outer margins 14, 16. Hinges 38, 40 provide for movement of the temple portions 30, 32 between open and closed positions thereof. It will be obvious that, in the open position of the temple portions 30, 32, lateral outward force applied to the insides of the temple portions 30, 32 will be exerted as a forwardly directed force immediately in front of the forward ends 34, 36 of the temples 30, 32, and force applied at the ends 34, 36 will create a forwardly directed bending movement about the bridge 18.

Referring now to FIGS. 1 and 5 in greater detail, the holder 8 will be seen to include base assembly 42, comprising a bottom flange 44 and a principle body portion 46.

Means for engaging the frame 10 in the vicinity of the bridge 18 are provided in the form of a clip 48, which, in this embodiment, includes a lower flange 50 through which fastening means in the form of a screw 52 extend, to secure the clip 48 to the base 42. Disposed intermediate the flange 50 and the body portion 46 of the base 42 is a stiff but resilient holder body 54 having stiff but resilient, left and right hand spring leaf portions 56, 58 forming a part thereof and extending laterally outwardly therefrom.

In the preferred construction, the entire body 54 including the leaves 56, 58 is a single, integral resilient element in the form of a plated or highly polished spring steel unit, and the clip 48 is preferably formed of the same or similar material.

In reference to FIG. 1, it will be noted that the leaves 56, 58 extend upwardly from a horizontal plane at a predetermined angle, that is, they are inclined outwardly and to the rear of the flange 50 in respect to the normal orientation of the eyeglasses on the wearer. The exact angle of inclination of the leaves 56, 58 is determined by the initial or original alignment of the spectacle frames. That is, the wings 56, 58 are adapted to engage the margins 14, 16 of the frame 10 so that when the frame 10 is in a predetermined alignment, little if any rearward force is applied thereto, but force will be applied thereto if the margins 14, 16 lie forwardly of the bridge 18 or other reference point of intended alignment. Normally, the alignment of the front surfaces of the margins 14, 16 and the front surfaces of the bridge 18 is coplanar, but this is not a necessity, particularly bearing in mind that the spectacle frames 10 may include one or more offset or protuberant parts, for example. The inclination of the leaves 56, 58 also serves to ensure that contact is between the leaves 56, 58 and the outer edges 14, 16 of the frames rather than with laterally more inwardly disposed parts of the glasses 12, such as the lenses 24, 26 or the like. At any rate, however, the thermoplastic frame 10 is deformable under the application of slight pressure, whereas the spring steel, although capable of deflection when the leaves or wings 56, 58 are engaged by the margins 14, 16 of a deformed or misaligned spectacle frame, continue to exert a realigning force on the frame 10 which is proportional to the forward displacement of the wings 56, 58. In use, the base 42 is normally constructed of a heavy material so as to support the spectacles 12 in the relation shown in FIG. 1 and to prevent the holder 8 and eyeglass 12 from being accidentally knocked over or upset.

Referring now to FIGS. 2, 3 and 4, an embodiment of the invention is shown which differs in two respects from the embodiments shown in FIGS. 1, 5 and 6. Thus, in reference to FIG. 2, it can be seen that wings 56a, 58a are provided for the holder 8a, and that a clip 48a is included near the center portion of the body 54a, In this construction, a notch 60 is formed in the front edge 62 of the body 54a, since a portion of the body 54a is folded upon itself to form the clip 48a, as best appears in FIG. 4, for example. As shown in FIGS. 2 and 3, this embodiment is extremely simple in construction and is particularly adapted to receive and realign a pair of spectacles during travel, for example. In this embodiment, the holder 8a and a pair of eyeglasses held therein do not occupy substantially any more space than the eyeglasses alone in the folded position thereof. In this manner, the entire unit 8a may be stored within a convenient cover or the like for travel or other purposes. The principle of operation is the same as that of the other embodiment of the invention, however.

Referring now to FIG. 7, a still further embodiment of the invention is shown, which differs in structural detail from the other embodiments, but operates in the same manner. Thus, it can be seen that a clip 48b is provided, and that the body 54b has a relatively flat center portion 60 which is set apart from the outer leaves 56b, 58b by a pair of oppositely disposed, slightly downwardly extending ribs 62, 64. In this embodiment, the bottom surface portions 66, 68, of the ribs 62, 64 which extend laterally of the element 54b, form a pair of support means or feet upon which the holder 8b rests, so that it is not likely to rock back and forth while in a position of rest atop a flat surface, such as a table or dresser top or the like.

FIG. 7 also shows, diagrammatically, a spray nozzle 70 from which synthetic feltlike fibers 72 are being deposited onto the holder 8b. In this embodiment, after the holder 8b is formed from spring steel, as shown, it is coated first with an adhesive and then with a velour or velvetlike finish, applied thereto by spraying the adhesive finish with synthetic resinous fibers in a well-known manner. The article resulting from this process, instead of a highly polished or plated surface, has a soft, velvetlike exterior surface for prevention of scratches which might otherwise occur on the lens or eyeglass frames.

In the use of the invention, all of the embodiments thereof have demonstrated that, provided the holder is used with reasonable frequency, the proper fit of eyeglasses on the head of the wearer may be maintained virtually indefinitely. By using the present device, the use of other disadvantageous, merely expedient methods of attempting to correct this problem may be avoided. Any version having the velvetlike or matte finish is particularly adapted for travel use, since no sharp edges are present for possible damage to clothing or to a cover or the like to which the holder might be carried.

The embodiment of the invention shown in FIGS. 2, 3 and 4 has the clip 48a integrally formed with the body 54a, whereas the embodiments of FIGS. 1, 5, 6 and 7 show the clip 48a, 48b associated with the body 54a, 54b formed as a separate piece. However, it is clear that the exact configuration or formation of the clips 48a, 48b, or the manner of association thereof with the bodies 54a, 54b does not form a particularly novel feature of the invention, but the constructions shown illustrate embodiments having various advantages. Likewise, the configuration or disposition of the base 42 is not a critical feature of the invention but is preferred in some embodiments thereof.

It will thus be seen that the present invention provides a new and useful holder for aligning eyeglass frames having a number of advantages and characteristics, including those pointed out herein and others which are inherent in the invention.

I claim:

1. A frame alignment holder for thermoplastic eyeglass frames having a frame including two laterally outer margin portions, a generally centrally disposed bridge portion, and a pair of temple pieces joined to said frame in the vicinity of said margin portions, said holder comprising, in combination, means for receiving the frame portion of a pair of eyeglasses in the vicinity of said bridge thereof to prevent relative rearward movement of said frame, means for engaging the forward surface of said frame in the vicinity of said outer margin portions thereof adjacent the junction of said temple pieces and said outer margin portions and generally laterally outwardly of said bridge, and for there exerting a predetermined, rearwardly directed force thereto for urging said laterally outer margin portions to the rear in relation to said bridge portion when said margin portions lie forwardly of a predetermined plane lying generally parallel to said bridge portion.

2. A holder unit as defined in claim 1 in which said means for preventing relative rearward movement of said frame comprises a clip adapted to be received over said bridge of said frame.

3. A holder unit as defined in claim 1 in which said means for engaging said margin portions comprises a pair of laterally outwardly extending, inherently resilient spring leaves, joined to each other at the inner portions thereof.

4. A holder unit as defined in claim 1 in which said holder comprises a body portion including two laterally outwardly extending leaf portions and a generally centrally disposed clip portion, said leaf portions being adapted to engage said margin portions of said frame and to exert said rearwardly directed force.

5. A holder as defined in claim 1 in which exterior surface thereof is covered with a soft material adapted to prevent damage to eyeglasses received in said holder upon contact between said material and said eyeglasses.

6. A holder as defined in claim 1 in which said means for engaging said margin portions comprises a pair of laterally outwardly and rearwardly extending leaves having portions thereof adapted to engage said margin portions.

7. A holder as defined in claim 2 in which said clip is integrally formed from the material comprising said means for engaging said margin portions of said frame.

8. A holder unit as defined in claim 1 in which means are provided for locating said holder in a desired position of use atop a horizontal surface.

9. A holder unit as defined in claim 8 in which said locating means comprise a relatively massive base unit.

10. A holder unit as defined in claim 8 in which said locating means comprises a pair of oppositely disposed ribs extending forwardly of said means for engaging said margin portions of said frame.

* * * * *